United States Patent Office 3,198,827
Patented Aug. 3, 1965

3,198,827
HYDROXY-BENZOIC ACID ETHERS AND
SALTS THEREOF
Gerhard Ohnacker, Biberach an der Riss, Germany, assignor, by mesne assignments to Boehringer Ingelheim G.m.b.H., Ingelheim (Rhine), Germany, a corporation of Germany
No Drawing. Filed May 9, 1961, Ser. No. 108,754
Claims priority, application Germany, May 9, 1960, T 18,350
10 Claims. (Cl. 260—521)

This invention relates to hydroxy-benzoic acid ethers as well as to alkali metal and alkaline earth metal salts of such ethers.

More particularly, the present invention relates to hydroxy-benzoic acid ethers of the formula (I)
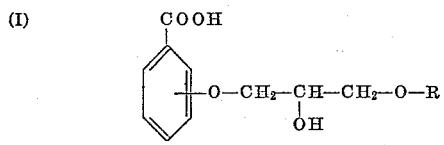

wherein R is selected from the group consisting of alkyl with 1–12 carbon atoms and cycloalkyl, especially cyclohexyl, as well as to alkali metal and alkaline earth metal salts of these ethers.

The compounds according to the present invention may conveniently be prepared by a number of methods, but the following have proved to be most suitable:

METHOD A

By reacting a compound of the formula

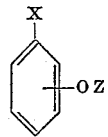
(II)

wherein X is a carboxyl group or a substituent which can be transformed into a carboxyl group, such as an ester, acid amide or nitrile group, and Z is hydrogen or the cation of an alkali, with a compound of the formula

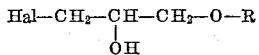
(III)

wherein R has the meanings previously defined in connection with Formula I and Hal is a halogen selected from the group consisting of chlorine, bromine and iodine.

The reaction is carried out at elevated temperatures and, if desired, in the presence of an inert organic solvent, such as a lower alkanol. The etherification reaction is preferably effected at the boiling point of the particular inert organic solvent if one is used.

In the event that X in the etherification reaction product is an ester, acid amide or nitrile group, it is subsequently converted into the desired carboxyl group by hydrolysis with an aqueous mineral acid or aqueous alkali.

If the process does not already yield the hydroxy-benzoic acid ethers of the Formula I in the form of their alkali metal salts or alkaline earth metal salts, they may readily be transformed into such salts by well known methods.

METHOD B

By reacting compounds of the formula

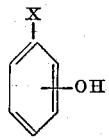
(IV)

wherein X is a carboxyl group or a substituent which may be converted into a carboxyl group, such as an ester, acid amide or nitrile group, with an epoxide of the formula

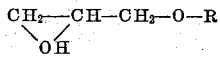
(V)

wherein R has the meanings previously defined in connection with Formula I. The reaction may be carried out, if desired, in the presence of an inert organic solvent. Moreover, the reaction may be accelerated with the aid of a catalyst, such as piperidine hydrochloride. If X in the reaction product is an ester, acid amide or nitrile group, it may readily be transformed into a carboxyl group by well known methods, as in Method A above.

METHOD C

By reacting a compound of the formula

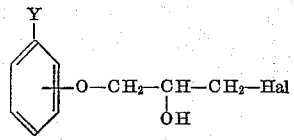
(VI)

wherein Y is an ester, acid amide or nitrile group and Hal is chlorine, bromine or iodine, with an alkali metal alcoholate of the formula

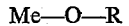
Me—O—R (VII)

wherein R has the meanings previously defined in connection with Formula I and Me is an alkali metal, in the presence of a suitable organic solvent, preferably an alcohol of the formula R—OH, wherein R has the meanings previously defined, at temperatures between 60 and 200° C. The reaction may also be carried out at the boiling point of the particular solvent.

Subsequently, the substituent Y is transformed into a carboxyl group as in Methods A and B above.

If the reaction products in Methods A, B and C above are obtained in the form of ester ethers, acid amide ethers or nitrile ethers, these intermediates do not have to be isolated in pure form. Instead, the raw intermediates may be subjected to the acid or alkaline hydrolysis to convert the ester, acid amide or nitrile group into the carboxyl group after removing any unreacted starting material which may be present in the raw intermediate reaction product. In other words, the purification of the end product may be postponed until after the hydrolysis step.

The following examples illustrate the preparations of a few representative members of the group of compounds of the Formula I according to the present invention. It should be understood, however, that these examples are given for purposes of illustration only and that the invention is not limited to the compounds illustrated in these examples.

EXAMPLE I

*Preparation of m-(3-isopropoxy-2-hydroxy)-propoxy-benzoic acid by Method A* m-Hydroxy-benzoic acid ethyl ester was subjected to a condensation reaction with 3-isopropoxy-2-hydroxy-1-chloropropane in the presence of sodium ethylate, yielding m - (3 - isopropoxy-2-hydroxy)-propoxy - benzoic acid ethyl ester of the formula

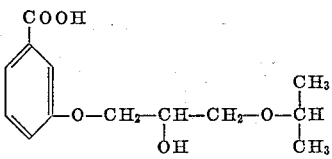

having a boiling point of 168–172° C. at 0.04 mm. Hg. 54 gm. of this intermediate product were admixed with 220 cc. of 2 N sodium hydroxide and the resulting mixture was refluxed for three hours. The reaction solution was allowed to cool, was then extracted twice with ether and was made acid with concentrated hydrochloric acid. An oil separated out which was extracted with ether. The ether extract solution was dried over sodium sulfate. After evaporating the ether in vacuo an oily residue was obtained which crystallized upon trituration. The crystalline product was recrystallized from a mixture of benzene and petroleum ether, yielding 30 gm. of a compound of the formula

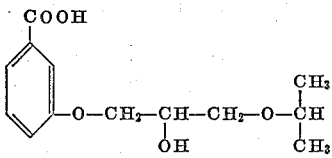

having a melting point of 92° C.

Using an analogous procedure, the following compounds were also prepared:

(a) m-(3-ethoxy-2-hydroxy)-propoxy-benzoic acid of the formula

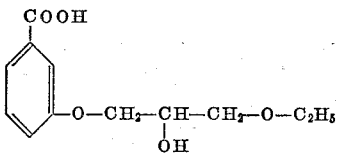

having a melting point of 84–85° C. from m-hydroxy-benzoic acid ethyl ester and 3-ethoxy-2-hydroxy-1-chloro-propane.

(b) m-(3-propoxy-2-hydroxy)-propoxy-benzoic acid of the formula

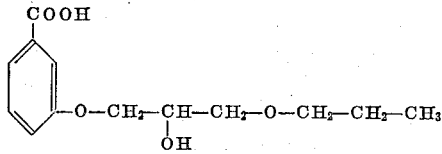

having a melting point of 57–60° C. from m-hydroxy-benzoic acid ethyl ester and 3-propoxy-2-hydroxy-1-chloro-propane.

(c) m-(3-hexoxy-2-hydroxy)-propoxy-benzoic acid of the formula

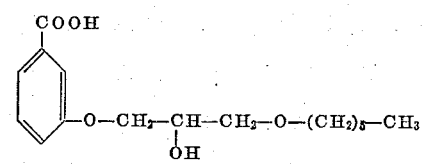

having a melting point of 72° C. from m-hydroxy-benzoic acid ethyl ester and 3-hexoxy - 2 - hydroxy-1-chloro-propane.

(d) m-(3-octoxy-2-hydroxy)-propoxy-benzoic acid of the formula

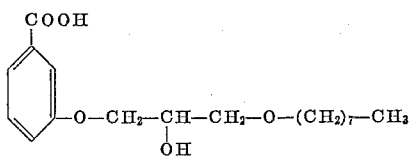

having a melting point of 54° C. from m-hydroxy-benzoic acid ethyl ester and 3-octoxy-2-hydroxy-1-chloro-propane.

(e) m-(3-nonoxy-2-hydroxy)-propoxy-benzoic acid of the formula

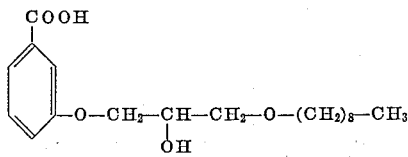

having a melting point of 55° C. from m-hydroxy-benzoic acid ethyl ester and 3-nonoxy-2-hydroxy-1-chloro-propane.

(f) m-(3-methoxy-2-hydroxy)-propoxy-benzoic acid of the formula

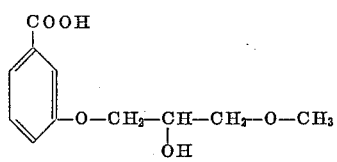

having a melting point of 115–116° C. from m-hydroxy-benzoic acid ethyl ester and 3-methoxy-2-hydroxy-1-chloro-propane.

(g) p-(3-methoxy-2-hydroxy)-propoxy-benzoic acid of the formula

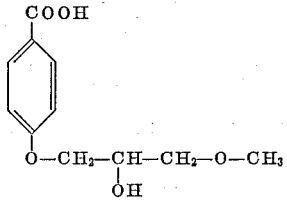

having a melting point of 115–117° C. from p-hydroxy-benzoic acid ethyl ester and 3-methoxy-2-hydroxy-1-chloro-propane.

EXAMPLE II

*Preparation of p-(3-isopropoxy-2-hydroxy)-propoxy-benzoic acid by Method A* p-Hydroxy-benzoic acid methyl ester was subjected to a condensation reaction with 3-propoxy-2-hydroxy-1-chloro-propane in the presence of sodium ethylate and ethanol as a solvent, yielding p-(3-isopropoxy-2-hydroxy)-propoxy-benzoic acid methyl ester of the formula

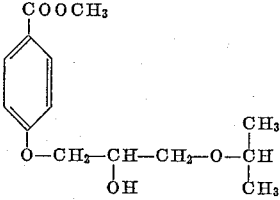

having a boiling point of 165–167° C. at 0.05 mm. Hg. 62 gm. of this intermediate product were admixed with 250 cc. of 2 N sodium hydroxide and the resulting mixture was refluxed for three hours. The reaction mixture was allowed to cool and was made acid with concentrated hydrochloric acid while cooling it on ice. An oil separated out which was extracted with ether. The ether extract solution was dried over sodium sulfate and then the ether was distilled off, leaving a crystalline mass as a residue. The crystalline product was recrystallized from a mixture of benzene and petroleum ether, yielding 27 gm. of a compound of the formula

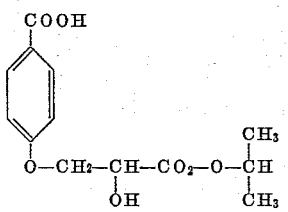

having a melting point of 98–99° C.

Using an analogous procedure, the following compounds were also prepared:

(a) m-(3-butoxy-2-hydroxy)-propoxy-benzoic acid of the formula

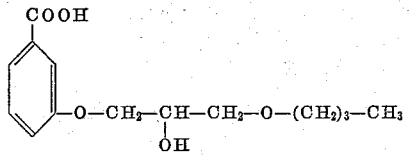

having a melting point of 45–48° C. from m-hydroxy-benzoic acid methyl ester and 3-n-butoxy-2-hydroxy-1-chloro-propane.

(b) m-(heptoxy-2-hydroxy)-propoxy-benzoic acid of the formula

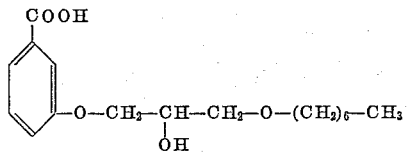

having a melting point of 63–65° C. from m-hydroxy-benzoic acid methyl ester and 3-n-heptoxy-2-hydroxy-1-chloro-propane.

(c) m - (3-decyloxy-2-hydroxy)-propoxy-benzoic acid of the formula

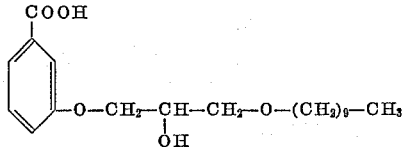

having a melting point of 53–54° C. from m-hydroxy-benzoic acid methyl ester and 3-n-decyloxy-2-hydroxy-1-chloro-propane.

(d) p-(3-ethoxy-2-hydroxy)-propoxy - benzoic acid of the formula

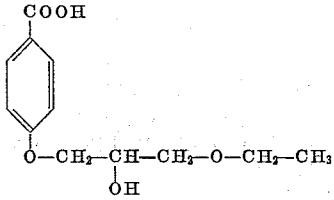

having a melting point of 98–100° C. from p-hydroxy-benzoic acid methyl ester and 3-ethoxy-2-hydroxy - 1-chloro-propane.

(e) p-(3-propoxy-2-hydroxy)-propoxy-benzoic acid of the formula

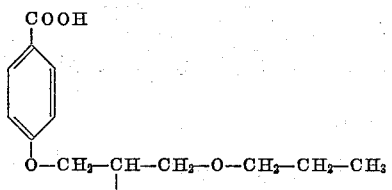

having a melting point of 108–110° C. from p-hydroxy-benzoic acid methyl ester and 3-n-propoxy-2-hydroxy-1-chloro-propane.

(f) p-(3-butoxy-2-hydroxy)-propoxy-benzoic acid of the formula

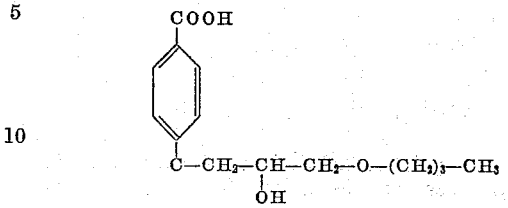

having a melting point of 82–84° C. from p-hydroxy-benzoic acid methyl ester and 3-n-butoxy-2-hydroxy-1-chloro-propane.

(g) p-(3-isobutoxy-2-hydroxy) - propoxy-benzoic acid of the formula

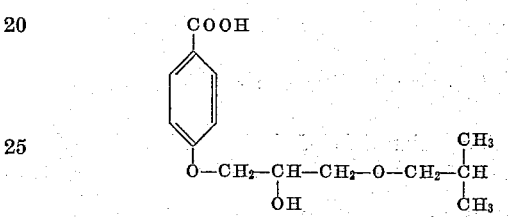

having a melting point of 91–93° C. from p-hydroxy-benzoic acid methyl ester and 3-n-amyloxy-2-hydroxyl-1-chloro-propane.

(h) p-(3-amyloxy-2-hydroxy) - propoxy-benzoic acid of the formula

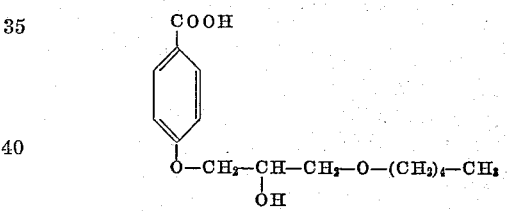

having a melting point of 73–75° C. from p-hydroxy-benzoic acid methyl ester and 3-n-amyloxy-2-hydroxy-1-chloro-propane.

(i) p-(3-hexoxy-2-hydroxy)-propoxy-benzoic of the formula

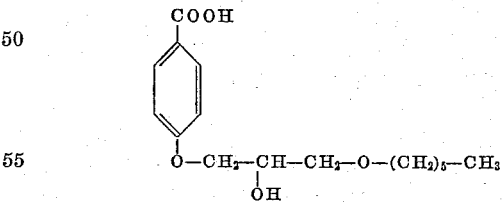

having a melting point of 68° C. from p-hydroxy-benzoic acid methyl ester and 3-n-hexoxy-2-hydroxy-1 - chloro-propane.

(j) p-(3-heptoxy-2-hydroxy)-propoxy-benzoic acid of the formula

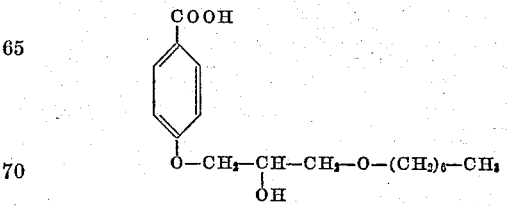

having a melting point of 74–75° C. from p-hydroxy-benzoic acid methyl ester and 3-n-heptoxy-2-hydroxy-1-chloro-propane.

(k) p-(3-octoxy-2-hydroxy)-propoxy-benzoic acid of the formula

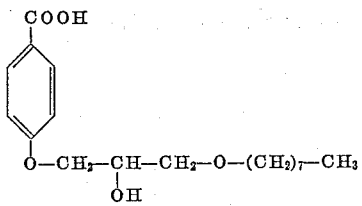

having a melting point of 85° C. from p-hydroxy-benzoic acid methyl ester and 3-n-octoxy-2-hydroxy-1-chloro-propane.

(l) p-(3-nonoxy-2-hydroxy)-propoxy-benzoic acid of the formula

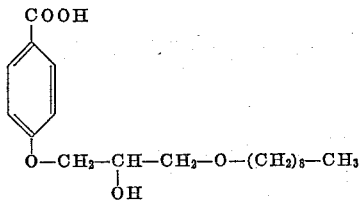

having a melting point of 64° C. from p-hydroxy-benzoic acid methyl ester and 3-n-nonoxy-2-hydroxy-1-chloro-propane.

(m) p-(3-decyloxy-2-hydroxy)-propoxy-benzoic acid of the formula

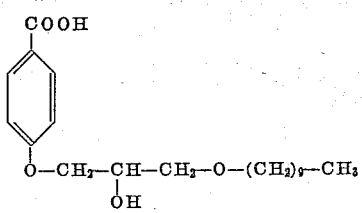

having a melting point of 88–91° C. from p-hydroxy-benzoic acid methyl ester and 3-n-decyloxy-2-hydroxy-1-chloropropane.

EXAMPLE III

*Preparation of o-(3-isopropoxy-2-hydroxy)-proxy-sodium benzoate by Method A*

Salicylamide was subjected to a condensation reaction with 3-isopropoxy-2-hydroxy-1-chloro-propane in the presence of sodium ethylate, yeilding o-(3-isopropoxy-2-hydroxy)-propoxy-benzamide of the formula

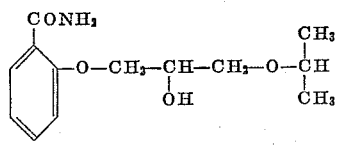

having a melting point of 70° C.

60 gm. of this benzamide ether were admixed with 300 cc. of 2 N sodium hydroxide, and the resulting mixture was refluxed for two and one-half hours while constantly passing nitrogen therethrough. Thereafter, the reaction solution was extracted with ether and the ether extract solution was discarded. The aqueous phase was adjusted to acid reaction with concentrated hydrochloric acid while cooling the mixture on ice, whereby a precipitate formed. The precipitate was separated and taken up in ether. It was purified by reprecipitating it from an aqueous sodium bicarbonate solution. The product thus obtained, which was identified to be o-(3-isopropoxy-2-hydroxy)-propoxy-benzoic acid of the formula

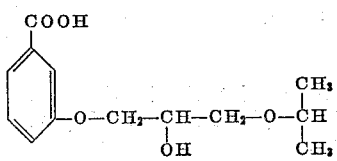

was taken up in ether and the solution was dried. Thereafter, the ether was distilled off, the residue was made exactly neutral with an aqueous sodium bicarbonate solution, the water was distilled off in vacuo and the solid residue was recrystallized from a mixture of ethanol and ether. 44 gm of o-(3-isopropoxy-2-hydroxy)-propoxy-sodium benzoate of the formula

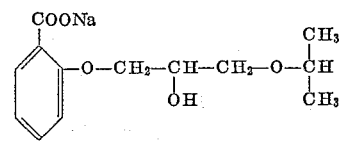

having a melting point of 162–164° C. were obtained.

Using an analogous procedure, the following compounds were also prepared:

(a) o-(3-methoxy-2-hydroxy)-propoxy-benzoic acid of the formula

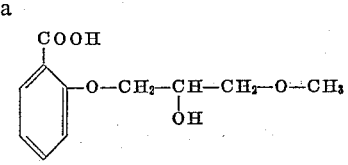

and its sodium salt (M.P.=209–210° C.) from salicylamide and 3-methoxy-2-hydroxy-1-chloro-propane.

(b) o-(3-ethoxy-2-hydroxy)-propoxy-benzoic acid of the formula

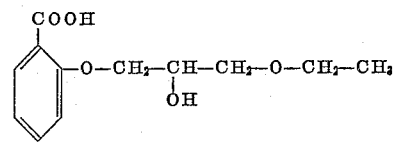

having a melting point of 58–59° C. from salicylamide and 3-ethoxy-2-hydroxy-1-chloro-propane.

(c) o-(3-n-propoxy-2-hydroxy)-propoxybenzoic acid of the formula

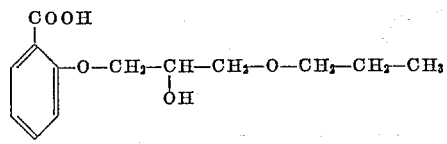

and its sodium salt (M.P.=143–144° C.) from salicylamide and 3-n-propoxy-2-hydroxy-1-chloro-propane.

(d) o-(3-isobutoxy-2-hydroxy)-propoxy-benzoic acid of the formula

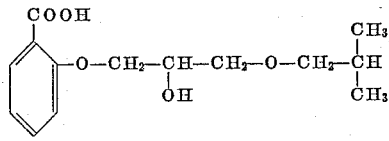

and its sodium salt (M.P.=185–187° C.) from salicylamide and 3-isobutoxy-2-hydroxy-1-chloro-propane.

(e) o-(3-n-amyloxy-2-hydroxy)-propoxy-benzoic acid of the formula

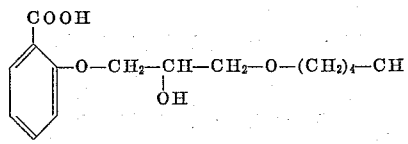

and its sodium salt (M.P.=137–139° C.) from salicylamide and 3-n-amyloxy-2-hydroxy-1-chloro-propane.

(f) o-(3-n-hexoxy-2-hydroxy)-propoxy-benzoic acid of the formula

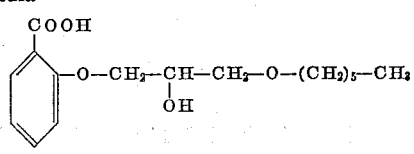

and its sodium salt (M.P.=147° C.) from salicylamide and 3-n-hexoxy-2-hydroxy-1-chloro-propane.

(g) o-(3 - n-heptoxy-2-hydroxy)-propoxy-benzoic acid of the formula

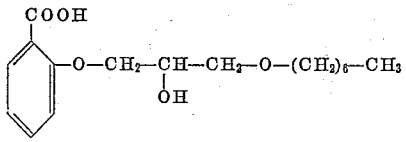

and its sodium salt (M.P.=140–142° C.) from salicylamide and 3-n-heptoxy-2-hydroxy-1-chloro-propane.

(h) o-(3-n-octoxy-2-hydroxy)-propoxy-benzoic acid of the formula

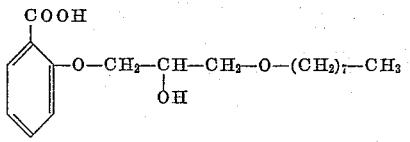

and its sodium salt (M.P.=141° C.) from salicylamide and 3-n-octoxy-2-hydroxy-1-chloro-propane.

(i) o-(3-n-nonoxy-2-hydroxy)-propoxy-benzoic acid of the formula

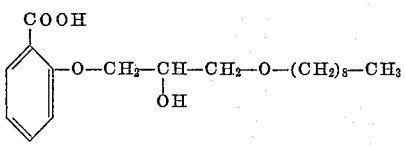

and its sodium salt (M.P.=132° C.) from salicylamide and 3-n-nonoxy-2-hydroxy-1-chloro-propane.

EXAMPLE IV

*Preparation of the calcium salt of o-(3-n-butoxy-2-hydroxy)-propoxy-benzoic acid by Method A*

Salicylamide was subjected to a condensation reaction with 3-n-butoxy-2-hydroxy-1-chloro-propane in the presence of sodium ethylate, yielding o-(3-n-butoxy-2-hydroxy)-propoxy-benzamide of the formula

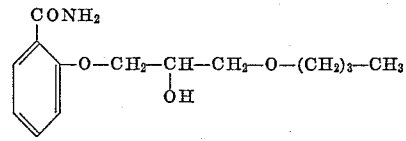

having a melting point of 62–63° C.

12 gm. of this salicylamide ether were admixed with 27 cc. of 2 N sodium hydroxide and the resulting mixture was refluxed for three hours while continuously passing nitrogen therethrough. The reaction solution was then allowed to cool and was extracted twice with ether, the ether extract solutions being discarded. The aqueous phase was acidified with 2 N hydrochloric acid, whereby an oil separated out. The oil was taken up in ether, the ether solution was dried over sodium sulfate, the ether was evaporated and the residue was covered with about 20 cc. of water. To this aqueous mixture 6 gm. of calcium carbonate were added in several small portions, the resulting mixture was vigorously stirred and the slurry thus obtained was allowed to stand for one hour. Thereafter, the slurry was admixed with 50 cc. of water and the excess calcium carbonate was filtered off. The filtrate was evaporated to dryness in vacuo, leaving as a residue 4 gm. of o-(3 - n-butoxy-2-hydroxy)-propoxy-calcium benzoate of the formula

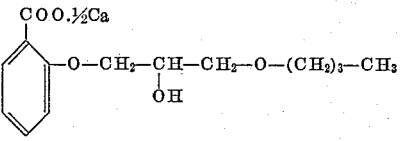

having a melting point of 101–103° C.

Using an analogous procedure, the following compound was also prepared:

(a) m-(3 - isobutoxy-2-hydroxy)-propoxy-calcium benzoate of the formula

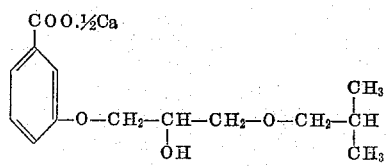

having a melting point of 128–130° C.

EXAMPLE V

*Preparation of p-(3-methoxy-2-hydroxy)-propoxy-benzoic acid by Method B*

A mixture of 15.2 gm. of p-hydroxy-benzoic acid methyl ether, 17.6 gm. of glycidol methyl ether and 0.5 gm. of piperidine hydrochloride was heated for five hours at 110–120° C. Thereafter, the excess unreacted glycidol ether was distilled off in vacuo and the residue, consisting essentially of p-(3-methoxy-2-hydroxy)-propoxy-benzoic acid methyl ester, was saponified by boiling it for two hours with 200 cc. of 2 N sodium hydroxide, yielding an aqueous alkaline solution of p-(3-methoxy-2-hydroxy)-propoxy-sodium benzoate. This solution was then made acid with hydrochloric acid, whereby a precipitate formed which was recrystallized from dilute ethanol. 13 gm. of p-(3-methoxy-2-hydroxy)-propoxy-benzoic acid having a melting point of 117–118° C. were obtained.

EXAMPLE VI

*Preparation of p-(3-methoxy-2-hydroxy)-propoxy-benzoic acid by Method C* p-Hydroxy-benzoic acid methyl ester was subjected to a condensation reaction with epichlorohydrin, yielding p-(3-chloro-2-hydroxy)-propoxy-benzoic acid methyl ester of the formula

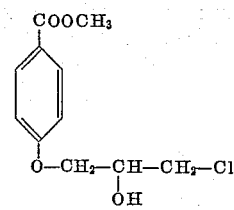

having a boiling point of 158–161° C. at 0.3 mm. Hg. 24.4 gm. of this ether ester were dissolved in 50 cc. of absolute methanol, and the resulting solution was added dropwise to a solution of 2.3 gm. of metallic sodium in 50 cc. of absolute methanol. The resulting mixture was refluxed for four hours, accompanied by stirring, and the precipitate formed thereby was then filtered off. The filtrate was concentrated by evaporation under reduced pressure, and the oily residue was boiled for three hours with 100 cc. of 2 N hydrochloric acid. The reaction mixture was then allowed to cool and the precipitate formed thereby was separated and recrystallized from dilute ethanol. 14 gm. of p-(3-methoxy-2-hydroxy)-propoxy-benzoic acid of the formula

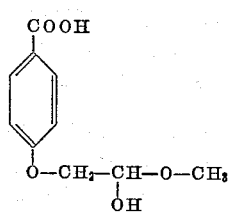

having a melting point of 117–118° C. were obtained.

EXAMPLE VII

*Preparation of the sodium salt of o-(3-amyloxy-2-hydroxy)-propoxy-benzoic acid by Method C*

9.5 gm. of salicylic acid nitrile were added to a solution of 1.9 gm. of metallic sodium in 70 cc. of absolute ethanol, and the resulting mixture was heated to the boiling point. Thereafter, 12 gm. of 3-n-amyloxy-2-hydroxy-propyl chloride were added and the mixture was refluxed for ten hours. The precipitate formed thereby was separated by vacuum filtration, and the filtrate was concentrated by evaporation. The evaporation residue was taken up in ether. The ether solution was shaken twice with 2 N sodium hydroxide and was then concentrated by evaporation. The evaporation residue was admixed with 100 cc. of 2 N sodium hydroxide and the mixture was refluxed for three hours while continuously passing nitrogen therethrough. The reaction mixture was then allowed to cool and was extracted with ether. The ether extract was discarded, while the aqueous phase was made acid with 2 N hydrochloric acid, whereby an oil separated out which was extracted with chloroform. The extract solution was concentrated by evaporation and the residue was exactly neutralized with an aqueous solution of sodium bicarbonate. After again evaporating the solution and triturating the residue with dry acetone, 9 gm. of the sodium salt of o-(3-amyloxy-2-hydroxy)-propoxy-benzoic acid of the formula

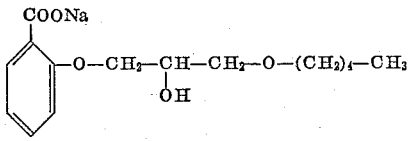

having a melting point of 137–139° C. were obtained.

EXAMPLE VIII

*Preparation of the sodium salt of o-(3-methoxy-2-hydroxy)-propoxy-benzoic acid by Method B*

Salicyclic acid nitrile was subjected to a condensation reaction with glycidol methyl ether, yielding o-(3-methoxy-2-hydroxy)-propoxy-benzonitrile of the formula

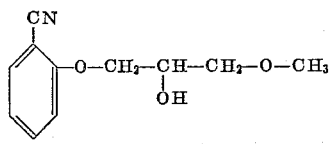

having a boiling point of 146° C. at 0.3 mm. Hg. 4.5 gm. of this benzonitrile ether were admixed with 50 cc. of 2 N sodium hydroxide, and the resulting mixture was refluxed for five hours while continuously passing nitrogen therethrough. The reaction product was extracted with ether and was then made acid with 2 N hydrochloric acid. The acid solution was saturated with sodium chloride and shaken with chloroform. The chloroform phase was separated and concentrated by evaporation, leaving as a residue an oil which was neutralized with an aqueous sodium bicarbonate solution. The resulting solution was evaporated to dryness and the residue was recrystallized from a mixture of methanol and acetone, yielding 2.8 gm. of o-(3-methoxy-2-hydroxy)-propoxy-sodium benzoate of the formula

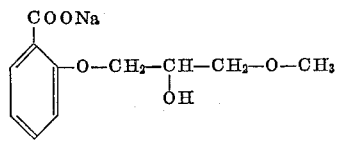

having a melting point of 209–210° C.

EXAMPLE IX

*Preparation of p-(3-methoxy-2-hydroxy)-propoxy-benzoic acid by Method B*

A mixture of 13.8 gm. of p-hydroxy-benzoic acid, 22 gm. of glycidol methyl ether and 0.5 gm. of piperidine hydrochloride was heated for twenty hours at 120° C. The reaction product was taken up in chloroform and the chloroform solution was extracted with 2 N sodium hydroxide. The chloroform phase was concentrated by evaporation and the oil remaining as a residue was saponified into the acid by boiling it for three hours with 100 cc. of 2 N sodium hydroxide. The reaction solution was extracted with ether, the ether extract solution was discarded, and the aqueous phase was acidified with 2 N hydrochloric acid. The precipitate formed thereby was separated and recrystallized from dilute ethanol, yielding 9 gm. of p-(3-methoxy-2-hydroxy)-propoxy-benzoic acid of the formula

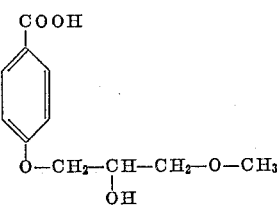

having a melting point of 118° C.

EXAMPLE X

*Preparation of p-(3-cyclohexyloxy-2-hydroxyl)-propoxy-benzoic acid by Method C* p-(3-chloro-2-hydroxy)-propoxy-benzoic acid methyl ester and cyclohexanol were subjected to a condensation reaction with sodium, yielding p-(3-cyclohexoxy-2-hydroxy)-propoxy-benzoic acid methyl ester of the formula

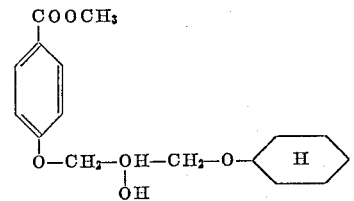

14 gm. of this raw ester ether were admixed with 100 cc. of 2 N sodium hydroxide, and the resulting mixture was refluxed for three hours. The reaction mixture was allowed to cool, was extracted twice with ether, and the aqueous phase was acidified with concentrated hydrochloric acid. An oil separated out, which was taken up in ether. The ether solution was dried over sodium sulfate and the ether was distilled off. An oil remained as a residue, which crystallized throughout upon being stirred. The crystalline product was recrystallized from dilute methanol, yielding 8 gm. of p-(3-cyclohexyloxy-2-hydroxy)-propoxy-benzoic acid of the formula

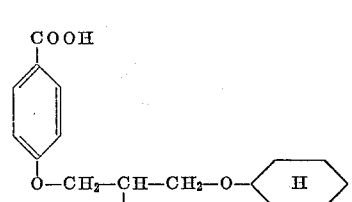

having a melting point of 118–120° C.

The compounds according to the present invention, that is, the compounds of the Formula I above and their alkali metal and alkaline earth metal salts are useful as pharmacological and therapeutic agents. More particularly, they exhibit highly effective choleretic activities, which are substantially superior to those of presently available choleretics of similar structure, both with respect to the increase in bile secretion and duration of effective action.

The hydroxy-benzoic acid ethers disclosed herein are, as a rule, insoluble in water; consequently, for therapeutic application they are advantageously administered in the form of their water soluble alkali metal or alkaline earth metal salts, such as their sodium salts or calcium salts.

The effective single dose for choleretic therapy is 100–200 mgm., and the daily dose rate is 300–800 mgm.

For therapeutic purposes the compounds according to the present invention are advantageously administered as active ingredients in customary dosage unit compositions, that is, as active ingredients in tablets, coated pills, solutions and the like. These dosage unit compositions may also comprise other therapeutic agents, such as spasmolytics, laxatives, enzymes and vitamins. The administration of dosage unit compositions containing the compounds according to the present invention as well as a spasmolytic as active ingredients is particularly advantageous in those cases where the gall bladder disorder is accompanied by painful spasms of the gall bladder and the bile ducts.

The following examples illustrate a few representative dosage unit compositions containing the compounds according to the invention as active ingredients, which may be employed for choleretic therapy. The parts are parts by weight unless otherwise specified.

EXAMPLE XI

Tablets

The tablet composition is compounded from the following ingredients:

| | Parts |
|---|---|
| o-(3-n-hexoxy-2-hydroxy-propoxy)-sodium benzoate | 100.0 |
| Sec. calcium phosphate | 100.0 |
| Polyvinyl pyrrolidone | 3.0 |
| Magnesium stearate | 2.0 |
| Potato starch | 45.0 |
| Total | 250.0 |

COMPOUNDING PROCEDURE

The active ingredient, the calcium phosphate and the polyvinyl-pyrrolidone are admixed, and the resulting mixture is kneaded until uniform with 30 parts of ethanol. The resulting moist mass is passed through a 1.5 mm.-mesh screen and the granulate is dried at 40° C. The dry granulate is again screened and is then admixed with the remainder of the ingredients. The finished mixture is finally pressed into tablets weighing 250 mgm. each. Each tablet contains 100 mgm. of the active ingredient.

EXAMPLE XII

Coated pills

The pill core is compounded from the following ingredients:

| | Parts |
|---|---|
| p-(3-isobutoxy-2-hydroxy-propoxy)-benzoic acid | 150.0 |
| Lactose | 60.0 |
| Corn starch, dry | 47.0 |
| Colloidal silicon dioxide | 6.0 |
| Glycerin | 6.0 |
| Potato starch, dry | 10.0 |
| Magnesium stearate | 1.0 |
| Total | 280.0 |

COMPOUNDING PROCEDURE

The active ingredient, the lactose, the corn starch and the colloidal silicon dioxide are admixed with each other. The resulting mixture is then kneaded with a 10% mucilage of the potato starch containing the glycerin until a uniform moist mass is obtained. The moist mass is passed through a 1.5 mm.-mesh screen and the resulting moist granulate is dried at 40° C. and again passed through the screen. The magnesium stearate is added and the finished mixture is pressed into pill cores weighing 280.0 mgm. each. The pill cores are then provided in the usual manner with a candy shell consisting essentially of sugar and talcum which is polished with beeswax. Each coated pill weighs approximately 400 mgm. and contains 150 mgm. of the active ingredient.

EXAMPLE XIII

Drops

The drop solution is compounded from the following ingredients:

| | Gm. |
|---|---|
| o-(3-n-heptoxy-2-hydroxy-propoxy)-sodium benzoate | 10.0 |
| Saccharin sodium | 1.0 |
| Glycerin | 15.0 |
| p-Hydroxy-benzoic acid methyl ester | 0.035 |
| p-Hydroxy-benzoic acid propyl ester | 0.015 |
| Peppermint oil | 0.05 |
| Menthol | 0.06 |
| Ethanol, pure | 10.0 |
| Distilled water, q.s. ad 100.0 ml. | |

COMPOUNDING PROCEDURE

The active ingredient, the saccharin sodium and the glycerin are dissolved in the distilled water (solution I). The p-hydroxy-benzoic acid esters, the peppermint oil and the methanol are dissolved in the ethanol (solution II). Solution I is admixed with solution II and the combined solution is filtered until clear. 1 ml. of solution contains 100 mgm. of o-(3-n-heptoxy-2-hydroxy-propoxy)-sodium benzoate.

EXAMPLE XIV

Gelatin capsules

The contents of the capsules are compounded from the following ingredients:

| | Parts |
|---|---|
| o-(3-n-hexoxy-2-hydroxy-propoxy)-benzoic acid | 200.0 |
| Beeswax | 10.0 |
| Total | 210.0 |

COMPOUNDING PROCEDURE

The beeswax is melted and the active ingredient, preheated to 70° C., is stirred into the molten wax. The resulting wax solution is cooled while stirring. 210 mgm. portions of this wax composition are filled into No. 4 soft gelatin capsules, for example by the Scherer Rotary Die Process. Each capsule contains 200 mgm. of the active ingredient.

EXAMPLE XV

Gelatin capsules m-(3-nonoxy-2-hydroxy-propoxy)-benzoic acid is passed through a 0.75 mm.-mesh screen, and 150 mgm. portions of the screened substance are filled into gelatin capsules of suitable size.

EXAMPLE XVI

*Coated pills containing a choleretic according to the present invention in combination with a spasmolytic and vitamin $B_1$*

The pill cores are compounded from the following ingredients:

| | Parts |
|---|---|
| o-(3-hexoxy-2-hydroxy-propoxy)-benzoic acid | 100.0 |
| Dimethyl-n-octyl-($\beta$-benzilic acid ethyl ester)-ammonium bromide (spasmolytic) | 10.0 |
| Vitamin $B_1$ mononitrate | 3.0 |
| Nicotinic acid amide | 15.0 |
| Colloidal silicon dioxide | 100.0 |
| Lactose | 50.0 |
| Corn starch | 100.0 |
| Polyethylene glycol 6000 | 1.0 |
| Tartaric acid | 1.0 |
| Magnesium stearate | 3.0 |
| Soluble starch | 27.0 |
| Total | 410.0 |

COMPOUNDING PROCEDURE

The o-(3-hexoxy-2-hydroxy-propoxy)-benzoic acid, the colloidal silicon dioxide, the lactose and 40 parts of the corn starch are admixed with each other, the resulting mixture is kneaded with a 10% aqueous solution of the soluble starch, the moist mass is passed through a 1.5 mm.-mesh screen, and the moist granulate is dried at 45° C. (granulate I).

The spasmolytic, the vitamin $B_1$ mononitrate, the nicotinic acid amide and 5 parts of the corn starch are admixed with each other, the resulting mixture is kneaded with a 15% ethanolic solution of the tartaric acid wherein the polyethylene glycol is also dissolved, the moist mass is passed through a 1.5 mm.-mesh screen, and the moist granulate thus obtained is dried at 40° C. (granulate II).

Granulates I and II are admixed, the magnesium stearate and the remaining corn starch are added, the mixture is homogenized and pressed into pill cores weighing 410 mgm. each. The pill cores are provided in the usual manner with a candy coating consisting essentially of sugar and talcum and the coated pills are polished with beeswax. Each pill weighs about 600 mgm. and contains 100 mgm. of the choleretic ingredient.

EXAMPLE XVII

*Coated pills containing a choleretic according to the present invention in combination with enzymes*

The pill cores are compounded from the following ingredients:

| | Parts |
|---|---|
| o-(3-hexoxy-2-hydroxy-propoxy)-benzoic acid | 100.0 |
| Pancreatin | 150.0 |
| Pepsin | 75.0 |
| Colloidal silicon dioxide | 100.0 |
| Lactose | 50.0 |
| Corn starch | 90.0 |
| Soluble starch | 30.0 |
| Magnesium stearate | 5.0 |
| Total | 600.0 |

COMPOUNDING PROCEDURE

A mixture of the choleretic ingredient, the colloidal silicon dioxide, the lactose and 30 parts of the corn starch is kneaded with a 15% aqueous solution of the soluble starch, the moist mass is passed through a 1.5 mm.-mesh screen and the moist granulate thus obtained is dried at 45° C. (granulate I).

A mixture of the pepsin with the remaining corn starch is moistened with ethanol, the moist mass is passed through a 1.5 mm.-mesh screen and the most granulate thus obtained is dried at 40° C. (granulate II).

Granulates I and II are admixed with each other and with the pancreatin and the magnesium stearate, the mixture is homogenized and pressed into pill cores weighing 600 mgm. each. The pill cores are then provided in the usual manner with a thin candy shell consisting essentially of sugar and talcum. The coated pills are finally polished with beeswax. Each pill weighs about 1000 mgm. and contains 100 mgm. of the choleretic ingredient.

EXAMPLE XVIII

*Gelatin capsules containing a choleretic according to the present invention in combination with a laxative agent*

The contents of the capsules are compounded from the following ingredients:

| | Parts |
|---|---|
| o-(3-butoxy-2-hydroxy-propoxy-benzoic acid | 200.0 |
| 3,3-bis-(p-actoxyphenyl)-oxindole (laxative) | 10.0 |
| Beeswax | 10.0 |
| Total | 220.0 |

COMPOUNDING PROCEDURE

The beeswax is melted and the choleretic ingredient, preheated to 70° C., is stirred into the molten wax. After cooling the resulting mixture to 30° C., the finely powdered laxative agent is suspended therein and the suspension is homogenized. 220 mgm. portions of the finished wax suspension are then filled into No. 4 soft gelatin capsules, for example by the Scherer Rotary Die Process. Each capsule contains 200 mgm. of the choleretic ingredient.

EXAMPLE XIX

*Coated pills containing a choleretic according to the present invention in combination with a laxative agent*

The pill cores are compounded from the following ingredients:

| | Parts |
|---|---|
| p-(3-isobutoxy-2-hydroxy-propoxy)-benzoic acid | 150.0 |
| 1,8-dihydroxy-anthraquinone (laxative) | 100.0 |
| Corn starch | 90.0 |
| Polyvniyl pyrrolidone | 5.0 |
| Magnesium stearate | 5.0 |
| Total | 350.0 |

COMPOUNDING PROCEDURE

The choleretic ingredient, the laxative agent, the corn starch and the polyvinyl pyrrolidone are admixed with each other, the resulting mixture is moistened with 75 parts of ethanol and the moist mass is passed through a 1.5 mm.-mesh screen. The moist granulate thus obtained is dried at 40° C. The dry granulate is admixed with the magnesium stearate and the resulting mixture is pressed into pill cores weighing 350 mgm. each. The pill cores are then provided in the customary manner with a thin candy shell consisting essentially of sugar and talcum, and the coated pills are polished with beeswax. Each pill weighs about 500 mgm. and contains 150 mgm. of the choleretic ingredient.

EXAMPLE XX

*Coated pills containing a choleretic according to the present invention and a spasmolytic agent*

The pill cores are compounded from the following ingredient:

| | Parts |
|---|---|
| o-(3-hexoxy-2-hydroxy-propoxy)-benzoic acid | 100.0 |
| α-(2,5-endomethylene-Δ³-cyclohexenyl)-mandelic acid-β-dimethyl-amino-ethyl ester-bromomethylate (spasmolytic) | 5.0 |
| Colloidal silicon dioxide | 100.0 |
| Lactrose | 50.0 |
| Corn starch | 112.0 |
| Soluble starch | 30.0 |
| Magnesium stearate | 3.0 |
| Total | 400.0 |

COMPOUNDING PROCEDURE

The choleretic ingredient, a milled mixture of the spasmolytic agent and the lactose, the colloidal silicon dioxide and 40 parts of corn starch are admixed with each other, and the resulting mixture is kneaded with a 15% aqueous solution of the soluble starch. The moist mass thus obtained is passed through a 1.5 mm.-mesh screen and the resulting moist granulate is dried at 45° C. The dry granulate is admixed with the remaining corn starch and the magnesium stearate, and the finished composition is pressed into pill cores weighing 400 mgm. each. The pill cores are then provided in the customary manner with a thin candy shell consisting essentially of sugar and talcum. The coated pill are polished with beeswax. Each pill weighs about 600 mgm. and contains 100 mgm. of the choleretic ingredient.

While I have illustrated my invention with the aid of certain specific embodiments thereof, it will be readily apparent to others skilled in this art that my invention is not limited to these particular embodiments, and that various other changes and modifications may be made without departing from the spirit of the invention or the scope of the appended claims.

I claim:

1. A compound selected from the group consisting of hydroxy-benzoic acid ethers of the formula

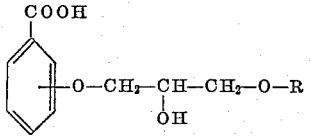

wherein R is selected from the group consisting of alkyl of 1 to 10 carbon atoms and cyclohexyl, their alkali metal salts and their alkaline earth metal salts.

2. o-(3-hexyloxy-2-hydroxy-propoxy)-benzoic acid.
3. o-(3-hexyloxy-2-hydroxy-propoxy)-sodium benzoate.
4. o-(3-heptyloxy-2-hydroxy-propoxy)-benzoic acid.
5. o-(3-heptyloxy-2-hydroxy-propoxy)-sodium benzoate.
6. o-(3-butoxy-2-hydroxy-propoxy)-benzoic acid.
7. o-(3-butoxy-2-hydroxy-propoxy)-calcium benzoate.
8. p-(3-isobutoxy-2-hydroxy-propoxy)-benzoic acid.
9. p-(3-isopropoxy-2-hydroxy-propoxy)-benzoic acid.
10. m-(3-nonyloxy-2-hydroxy-propoxy)-benzoic acid.

References Cited by the Examiner

UNITED STATES PATENTS

| | | | |
|---|---|---|---|
| 2,606,922 | 8/52 | Papa et al. | 260—521 |
| 2,681,363 | 6/54 | Schwenk et al. | 260—521 |
| 2,753,288 | 7/56 | Visscher | 167—55 |
| 2,801,951 | 8/57 | Cooper | 167—55 |

FOREIGN PATENTS 605,737 7/43 Great Britain.

LORRAINE A. WEINBERGER, *Primary Examiner.*

CHARLES B. PARKER, LEON ZITVER, *Examiners.*

UNITED STATES PATENT OFFICE
CERTIFICATE OF CORRECTION

Patent No. 3,198,827

August 3, 1965

Gerhard Ohnacker

It is hereby certified that error appears in the above numbered patent requiring correction and that the said Letters Patent should read as corrected below.

Column 2, formula (V) should appear as shown below instead of as in the patent:

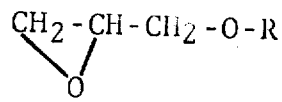

column 6, lines 5 to 11, the formula should appear as shown below instead of as in the patent:

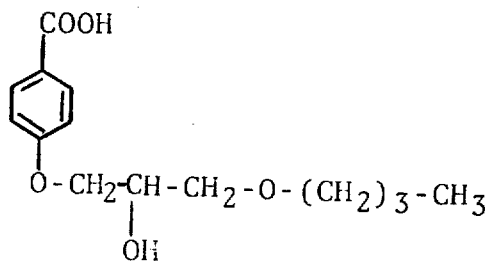

line 30, for "3-n-amyloxy-2-hydroxyl-" read -- 3-isobutoxy-2-hydroxy- --; line 47, after "-benzoic" insert -- acid --; column 7, line 44, for "proxy-sodium", in italics, read -- propoxy-sodium --, in italics; line 47, for "yeilding" read -- yielding --; column 8, lines 60 to 64, the formula should appear as shown below instead of as in the patent:

3,198,827

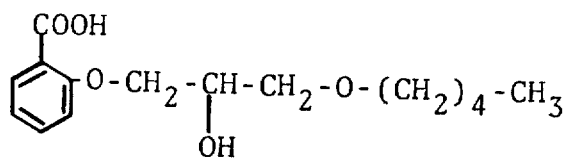

column 12, lines 40 to 48, the formula should appear as shown below instead of as in the patent:

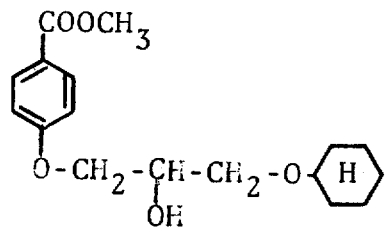

column 16, line 26, after "-propoxy" insert a closing parenthesis; line 27, for "p-actoxyphenyl" read -- p-acetoxyphenyl --; column 17, line 34, for "pill" read -- pills --.

Signed and sealed this 1st day of March 1966.

(SEAL)
Attest:

ERNEST W. SWIDER
Attesting Officer

EDWARD J. BRENNER
Commissioner of Patents